United States Patent [19]

Snel

[11] 4,369,273

[45] Jan. 18, 1983

[54] LIQUID STABILIZING COMPOSITION AND CHLORINE CONTAINING THERMOPLASTICS STABILIZED THEREWITH

[75] Inventor: Martinus A. Snel, Haarlem, Netherlands

[73] Assignee: Nautamix B.V., Haarlem, Netherlands

[21] Appl. No.: 180,469

[22] Filed: Aug. 22, 1980

[30] Foreign Application Priority Data

Aug. 22, 1979 [NL] Netherlands ........................ 7906338

[51] Int. Cl.³ .......................... C08K 5/16; C08K 5/34; C08K 5/36; C09K 15/30
[52] U.S. Cl. .................... 524/89; 252/400 R; 252/401; 252/406; 252/407; 524/147; 524/252; 524/300; 524/322; 524/334; 524/350; 524/368; 524/401; 524/434; 524/436
[58] Field of Search ........................ 252/400 R, 401; 260/23 XA, 45.75 W, 45.8 N, 45.9 R, 45.95 N; 524/89, 252, 368, 434

[56] References Cited

U.S. PATENT DOCUMENTS

| | | | |
|---|---|---|---|
| 3,936,422 | 2/1976 | Wirth et al. | 260/45.95 N |
| 4,042,549 | 8/1977 | Ahr et al. | 260/23 XA |
| 4,116,908 | 9/1978 | Emery | 260/23 XA |
| 4,119,601 | 10/1978 | Bonnaud et al. | 260/23 XA |
| 4,169,819 | 10/1979 | Shiohara et al. | 260/23 XA |
| 4,178,282 | 12/1979 | Bae | 260/23 XA |
| 4,182,698 | 1/1980 | Ellis | 260/23 XA |
| 4,220,570 | 9/1980 | Loffelholz et al. | 260/23 XA |

*Primary Examiner*—John Kight, III
*Assistant Examiner*—R. A. White
*Attorney, Agent, or Firm*—Wilkinson, Mawhinney & Theibault

[57] ABSTRACT

A stabilizing composition consisting of substituted alpha- or beta-naphthindoles, benzoylated or not benzoylated, and combined with organic polyimines such as those of formula 1 of the formulae sheet, in which R is alkyl or dialkyl, ethoxylated alkylmercaptans with 2–8 ethoxy groups and (metal) halides of barium, calcium, lithium, zinc or aluminum, have a strong thermostabilizing effect on chlorine containing thermoplastics, especially on polyvinyl chloride, both homo-M and S polymers thereof, and on polyvinylidene chloride.

21 Claims, 6 Drawing Figures

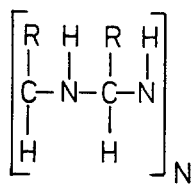
Formule 1
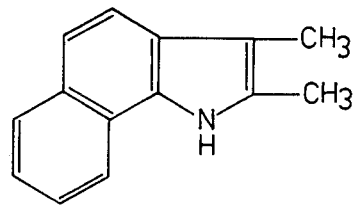
Formule 2
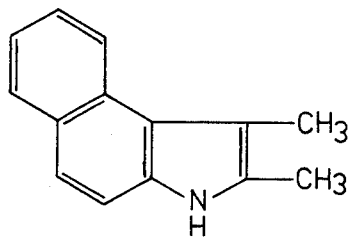
Formule 3
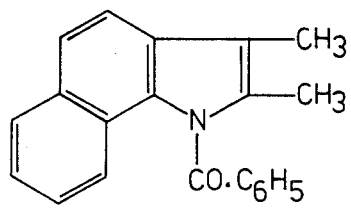
Formule 4
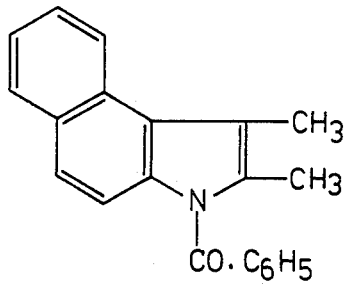
Formule 5
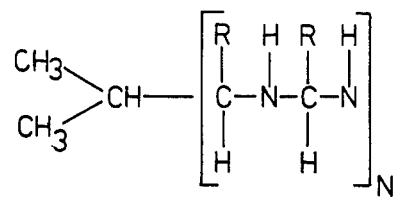
Formule 6

4,369,273

LIQUID STABILIZING COMPOSITION AND CHLORINE CONTAINING THERMOPLASTICS STABILIZED THEREWITH

BACKGROUND OF THE INVENTION

It is known that chlorine containing thermoplastics, such as e.g. polyvinyl chloride, split off HCl under thermal load, accompanied by discoloration and degradation.

In order to prevent this so-called thermostabilizers are added, the little poisonous and most effective of which are the organotin mercaptides and the dialkyltin carboxylates.

Those detrimental to health comprise the organometallic compounds of strontium, cadmium and lead.

U.S. Pat. No. 3,644,246 discloses a mixture of dialkyltin carboxylates and sodium, magnesium, calcium or aluminum salts of halfesters of unsaturated dicarboxylic acids, e.g. maleic acid. Beside the formation of anhydride at elevated temperatures there is the disadvantage that stabilizers on this base if combined with phosphites cannot be kept.

According to British Pat. Nos. 1,229,521 and 1,229,522 and Japanese Pat. specification No. 4723442 organotin mercaptides containing calcium, magnesium and barium compounds are proposed. However, it is known that such combinations develop a strong odour during processing.

The present invention is characterized in that the stabilizer compositions contain no tin, lead, cadmium or strontium, whereas also unsaturated dicarboxylic acids, such as maleic acid, are completely absent.

During processing at elevated temperatures no volatile, prickling or strongly smelling substances are developed, and yet the chlorine containing thermoplastics have an effective protection against degradation at elevated temperatures.

Furthermore no "plate out" occurs during processing on calanders.

The combination with liquid organic phosphites is readily possible; they can serve as light stabilizer and solvent.

Addition of solvents such as glycols, glycol ethers and aromatic solvents is not advisable as at elevated processing temperatures odour, volatile vapours and gases develop.

Moreover the stabilizing composition of the present invention may contain anti-oxidants, such as sterically hindered alkyl phenols, such as 2,6-di-tert. butyl-4-methylphenol and 4-hydroxymethyl-2,6-di-tert. butylphenol.

Addition of (2,4-di-tert.butylphenyl)-3,5-di-tert.butyl-4-hydroxybenzoate provides in combination with organic phosphites a substantially increased light resistance.

SUMMARY OF THE INVENTION

According to the present invention it has been found that a stabilizing composition consisting of substituted alpha- or beta-naphthindoles, benzoylated or not benzoylated, and combined with organic polyimines such as those of formula 1 of the formulae sheet, in which R is alkyl or dialkyl, ethoxylated alkylmercaptans with 2-8 ethoxy groups and (metal) halides of barium, calcium, lithium, zinc or aluminum, have a strong thermostabilizing effect on chlorine containing thermoplastics, especially on polyvinyl chloride, both homo-M and S polymers thereof, and on polyvinylidene chloride.

Also copolymers of vinyl chloride and vinyl acetate, copolymers of ethylene, vinyl chloride and vinyl acetate and copolymers of vinylidene chloride are strongly thermally stabilized by the said stabilizing composition.

It is not necessary that the chlorine containing thermoplastic contains a plasticizer.

Both initial and final stability are excellent, also on long-term keeping.

The substitution of the naphthindoles can be alkyl or aryl or combinations of both, whereas also hydroxy, methoxy and ethoxy groups may be present.

Isostearic acid and isostearic acid esters or mixtures thereof may serve as solvent, possibly combined with organic phosphites. If used they also serve as lubricant (vide Belgian Pat. specification No. 872,794) and give the end-product (film or bottle) a strong anti-blocking and anti-sticking effect, whereas to products containing a plasticizer they provide the effect of improved hand and drape.

Metal salts of isostearic acid act strongly as internal and external lubricant. Especially the lithium salt of isostearic acid gives particularly glass-clear film and bottles in combination with benzoylated substituted naphthindoles, polybutyl imine, zinc chloride and an ethoxylated tert.dodecylmercaptan with 4,5 ethoxy groups. Thermal stability is excellent herewith.

Example of a synthesis for some substituted naphthindoles:

METHYL ALPHA-BROMO-ETHYL KETONE

A mixture of 468 g (6,5 moles) methyl ethyl ketone and 1500 cc water was heated at 60° C. with nitrogen being passed through, after which 960 g (6.0 moles) bromine was added thereto by dripping. After the end of the reaction the separated oil was washed subsequently with water, sodium bicarbonate solution and water, and finally dried over calcium chloride. After fractional distillation with the aid of a long Vigreux column or Widmer spiral 350 g of a colourless oil, boiling at 45°–47° C./19 mm Hg, was obtained.

2,3-DIMETHYL-ALPHA-NAPHTHINDOLE (Formula 2 of the formulae sheet)

138 g of methyl alpha-bromoethyl ketone and 275 g of alpha-naphthylamine (molar ratio 1:2.05) were solved together in 500 ml of 96% ethyl alcohol and boiled for 8 hours. Then, while boiling, water was added to the mixture, until it just started to become turbid. Upon cooling down the naphthindole crystallized. It was filtrated by suction and for purification it was once boiled up with diluted HCl. After filtration by suction and drying 169 g of substantially pure naphthindole (yield 94%) resulted. For obtaining a 100% pure product one may recrystallize from a mixture of benzene and petroleum ether. In that case white silver-glossy leaflets are formed, melting at 150–151° C.

2,3-DIMETHYL-BETA-NAPHTHINDOLE (Formula 3 of the formulae sheet)

In an analogous way, starting from beta-naphthylamine, 2,3-dimethyl-beta-naphthindole, melting at 131°–132° C., can be obtained in a yield of 72%. During the reaction a slight resinification occurs. Therefore, after the reaction only a small amount of water should be added, whereupon an amount of resin separates, which should be filtrated by suction first, before more water is added to the alcoholic solution until turbidity occurs, after which, upon cooling, the beta-naphthindole separates in the form of colorless hard crystals.

BENZOYL-2,3-DIMETHYL-ALPHA-NAPHTHINDOLE (Formula 4 of the formulae sheet)

Benzoyl chloride was dripped slowly into a solution of 2,3-dimethyl-alpha-naphthindole. After completion of the addition nitrogen is passed through and the temperature is raised slowly until boiling, whereby the remaining HCl is driven off. The toluene is distilled off under vacuum and ethyl alcohol is added, in which the mass dissolves readily, after which water is added until turbidity occurs. After cooling down the product crystallizes.

BENZOYL-2,3-DIMETHYL-BETA-NAPHTHINDOLE (Formula 5 of the formulae sheet)

In this case in an analogous manner 2,3-di-methyl-beta-naphthindole is benzoylated in solution. Also in this case the solvent is toluene and the recrystallization is carried out in a mixture of ethyl alcohol and water.

POLYBUTYL IMINE (Formula 6 of the formulae sheet, in which R is $CH_3-CH_2-CH_2-$)

Commercial butyraldehyde (a by-product of the production of synthetic rubber) having a density of 0,82 g/cm$^3$, containing 6-7% of acetaldehyde and propionaldehyde and for 75-80% consisting of a mixture of butyraldehyde and isobutyraldehyde, the remainder consisting of water, butanol and minor quantities of higher alcohols and aldehydes, is saturated with NH$_3$ gas. The reaction product separates into two layers. The upper layer consists of the aldehyde/ammonia, which has a typical odour and is viscous. The lower layer consists of water, containing butyl and other alcohols. The separated butyraldehyde/ammonia is heated at 110° C. for 2-3 hours, during which the viscosity increases by polymerisation of the butyrimine formed.

Example of a synthesis of ethoxylated tert. dodecyl mercaptan, $C_{12}H_{25}S(CH_2.CH_2.O)_nH$, in which n=2-8.

202 kg of dry tert.dodecyl mercaptan and 1 kg of solid KOH, ground to powder, are put into a stainless steel pressure kettle (6 atm), provided with a blade agitator revolving at 500 r.p.m. and a heating jacket up to 8 atm. for steam heating and water cooling, respectively. The exthylene oxide is introduced from below into the bottom of the kettle by means of a stainless steel pipe. The introduction can be monitored by means of a looking glass. The tert.dodecyl mercaptan is heated at 130° C. under introduction of nitrogen in order to expel the air. Hereafter the kettle is closed, and addition takes place of:

| | |
|---|---|
| (a) for 2 ethoxy groups | 88 kg of ethylene oxide |
| (b) for 4 ethoxy groups | 176 kg of ethylene oxide |
| (c) for 7 ethoxy groups | 308 kg of ethylene oxide |

The pressure as maintained at 0.8-1.2, atm., optionally the temperature is allowed to rise to 150° C. After the reaction neutralisation is carried out with propionic acid. Duration of the reaction is about 3-4 hours, depending on the amount of ethylene oxide added. Practically quantitative yield.

| Stabilizer M1 | |
|---|---|
| Zinc chloride, anhydrous | 105 g |
| Water | 35 g |
| 2-Ethoxy-tert.dodecyl mercaptan | 200 g |
| 7-Ethoxy-tert.dodecyl mercaptan | 230 g |
| Isostearic acid | 430 g |

The zinc chloride is solved in the amount of water and mixed under agitation with the 7-ethoxy-tert.dodecyl mercaptan, after which the 2-ethoxy-tert. dodecyl mercaptan and the isostearic acid are added successively under agitation. A clear light yellow liquid is obtained.

| Stabilizer M2 | |
|---|---|
| Zinc chloride, anhydrous | 80 g |
| Lithium chloride, anhydrous | 35 g |
| Water | 60 g |
| 2-Ethoxy-tert.dodecyl mercaptan | 200 g |
| 7-Ethoxy-tert.dodecyl mercaptan | 230 g |
| Isostearic acid | 430 g |

The zinc chloride and the lithium chloride are solved in the amount of water and mixed with the 7-ethoxy-tert.dodecyl mercaptan under agitation, after which subsequently the 2-ethoxy-tert.dodecyl mercaptan and the isostearic acid are added under agitation. A clear light yellow liquid is obtained.

| Stabilizer M3 | |
|---|---|
| Zinc chloride, anhydrous | 80 g |
| Barium chloride, anhydrous | 35 g |
| Water | 62 g |
| 2-Ethoxy-tert.dodecyl mercaptan | 200 g |
| 7-Ethoxy-tert.dodecyl mercaptan | 230 g |
| Isostearic acid | 430 g |

Same procedure as M2.

| Stabilizer M4 | |
|---|---|
| Aluminum chloride, anhydrous | 80 g |
| Calcium chloride, anhydrous | 35 g |
| Water | 60 g |
| 2-Ethoxy-tert.dodecyl mercaptan | 200 g |
| 7-Ethoxy-tert.dodecyl mercaptan | 230 g |
| Isostearic acid | 430 g |

EXAMPLE I

Liquid stabilizing composition for rigid P.V.C., e.g. bottles. Addition: 6.7-7 kg per 100 kg of P.V.C., k-value 55/60.

| | |
|---|---|
| Epoxy soy bean oil | 3400 g |
| Trinonyl-phenyl phosphite | 600 g |
| Calcium isostearate | 300 g |
| Glycerol monoisostearate | 250 g |
| Pentaerithritol mono-p-tert.butyl benzoate triisostearate | 1200 g |
| Pentaerithritol trimontanate monoisostearate | 300 g |
| Wax AC 316, Allied Chemicals (polyethylene wax) | 50 g |
| Benzoyl-2,3-dimethyl-alpha-naphthindole | 50 g |
| Polybutyl imine | 150 g |
| Stabilizer M1 | 300 g |

| | |
|---|---|
| Isostearic acid | 100 g |

Heat at 90° under agitation and passing through of nitrogen, until everything has been solved, then cool again to 40° C., after which it is ready for use.

EXAMPLE II

Liquid stabilizing composition for rigid P.V.C., e.g. film and bottles. Per 100 kg of PVC also 8 kg of modified Kane Ace B 28 (MBS) is added, as an impact resistance component. Addition: as in Example I.

| | |
|---|---|
| Epoxy soy bean oil | 3400 g |
| Trinonyl-phenyl phosphite | 600 g |
| Calcium isostearate | 300 g |
| Pentaerythritol monoisostearate | 600 g |
| Pentaaerythritol di-p-tert.butyl benzoate diisostearate | 600 g |
| Butane-1,4-diol monomontanate monoisistearate | 300 g |
| Wax AC 316 | 50 g |
| 2,3-Dimethyl-alpha-naphthindole | 100 g |
| Polybutyl imine | 100 g |
| Stabilizer M2 | 300 g |
| Isostearic acid | 80 g |

Procedure as described in Example I.

EXAMPLE III

Liquid stabilizing composition for rigid P.V.C., especially for injection molding purposes. Per 100 kg of P.V.C., k-value 55/60, 6.7–7 kg of stabilizing composition and 8 kg of Kane Ace B 28 impact resistance component are used.

| | |
|---|---|
| Epoxy soy bean oil | 3400 g |
| Trinonyl-phenyl phosphite | 600 g |
| Calcium isostearate | 300 g |
| Trimethylolpropane monoisostearate | 250 g |
| Pentaerythritol tri-p-tert.butylbenzoate monoisostearate | 1200 g |
| Pentaerythritol dimontanate diisostearate | 300 g |
| Wax AC 316 | 50 g |
| Benzoyl-2,3-dimethyl-alpha-naphthindole | 50 g |
| Dimethyl-beta-naphthindole | 25 g |
| Polybutyl imine | 275 g |
| Stabilizer M3 | 300 g |
| Isostearic acid | 100 g |

Procedure as described in Example I.

EXAMPLE IV

Liquid stabilizing composition for soft P.V.C., suitable for film and injection molding articles. Per 100 kg of P.V.C., k-value 68/72, 4.2–5 kg of the present stabilizing compositions and 50 kg of dioctyl adipate are added.

| | |
|---|---|
| Epoxy soy bean oil | 1000 g |
| Diphenyl-myristyl phosphite | 400 g |
| Calcium isostearate | 300 g |
| Glycerol monostearate | 250 g |
| Pentaerythritol tetraisostearate | 1200 g |
| Pentaerythritol trimontanate monoisostearate | 300 g |
| Isostearic acid | 250 g |
| Benzoyl-2,3-dimethyl-alpha-naphthindole | 100 g |
| Stabilizer M4 | 300 g |
| Polybutyl imine | 150 g |

Procedure as described in Example I.

EXAMPLE V

Liquid stabilizing composition for soft P.V.C., suitable for film, injection molding and plastisols. Per 100 kg of P.V.C., k-value 70/72, 4.4–5 kg of the present stabilizing composition is added.

| | |
|---|---|
| Epoxy soy bean oil | 1000 g |
| Diphenyl-myristyl phosphite | 600 g |
| Lithium isostearate | 300 g |
| Glycerol monostearate | 250 g |
| Pentaerythritol tetraisostearate | 1200 g |
| Pentaerythritol trimontanate monoisostearate | 300 g |
| Isostearic acid | 250 g |
| Benzoyl-2,3-dimethyl-beta-naphthindole | 50 g |
| 2,3-Dimethyl-alpha-naphthindole | 25 g |
| Polybutyl imine | 150 g |
| Stabilizer M2 | 300 g |
| Stabilizer M2 (2,4-di-tert.butylphenyl)-3,5-di-tert.butyl-4-hydroxybenzoate | 50 g |

Procedure as describes in Example I.

EXAMPLE VI

Plastisol from S P.V.C., k-value 70/72, plasticizer content 50%. Per 100 kg of P.V.C. 2.7–3 kg of the stabilizing composition of the present Example is used corresponding with 200 kg of plastisol (P.V.C.: plasticizer = 1:1).

| | |
|---|---|
| Lithium isostearate | 300 g |
| Stabilizer M2 | 300 g |
| Polybutyl imine | 300 g |
| Benzoyl-2,3-dimethyl-alpha-naphthindole | 100 g |
| Pentaerythritol monomontanate triisostearate | 300 g |
| Pentaerythritol monoisostearate monoadipate | 800 g |
| Isostearic acid | 150 g |
| Triphenyl phosphite | 300 g |

Procedure as described in Example I.

EXAMPLE VII

| | | |
|---|---|---|
| P.V.C. resin, k-value 67/68 | 100 | parts by weight |
| Omya BSH (calcium carbonate) | 8 | " |
| Carbon black | 0.6 | " |
| Calcium dialkyl-phenolate | 2.76 | " |
| Stabilizer M1 | 0.30 | " |
| Polybutyl imine | 0.10–0.40 | " |
| Trimethylol diisostearate | 0.60 | " |
| Diphenyl isooctyl phosphite | 0.30 | " |
| Benzoyl-2,3-dimethyl-alpha-naphthindole | 0.05 | " |
| Epoxy soya bean oil | 2.00 | " |
| Isostearic acid | 0.50 | " |

The above components are mixed at ambient temperature until a dry powder is obtained. This powder is suitable for the extrusion of tubes. As mixing apparatus the Nautamixer with Rotor-Dispenser can be used.

EXAMPLE VIII

| | | |
|---|---|---|
| P.V.C. resin, k-value 67/71 | 100 | parts by weight |
| Omya BSH (chalk) | 10 | " |
| Barium dialkyl-phenolate | 2.75 | " |
| Titanium dioxyde | 0.50 | " |
| Stabilizer M1 | 0.30 | " |
| Polybutyl imine | 0.10 | " |
| Benzoyl-2,3-dimethyl-alpha-naphthindole | 0.005 | " |

-continued

| | | |
|---|---|---|
| Diphenyl isooctyl phosphite | 0.60 | " |
| Epoxy soya bean oil | 2.00 | " |
| Dibutyl phthalate | 15.00 | " |
| Dioctyl phthalate | 35.00 | " |
| Pentaerythritol tetraisostearate | 0.40 | " |
| (Dipropylene glycol) adipate (polymer) | 10.00 | " |
| Isostearic acid | 0.30 | " |

The above components are heated at 100° C., until a dry powdery agglomerate is obtained. This powdery agglomerate is suitable for injection molding of e.g. shoe soles and other flex. P.V.C. injection molding products as well as for the extrusion of garden-hose and flexible profiles.

EXAMPLE IX

| | | |
|---|---|---|
| Emulsion-type P.V.C. resin, k-value 70/72 | 100 | parts by weight |
| Barium dialkyl-phenolate | 2.75 | " |
| Stabilizer M1 | 0.30 | " |
| Diphenyl isooctyl phosphite | 1.00 | " |
| Polybutyl imine | 0.10 | " |
| 2,3-Dimethyl-alpha-naphthindole | 0.005 | " |
| Epoxy soy bean oil | 3.00 | " |
| Dibutyl phthalate | 20.00 | " |
| Dioctyl adipatae | 30.00 | " |
| Dioctyl phthalate | 30.00 | " |
| (Dipropylene glycol) adipate (polymer) | 20.00 | " |
| Pentaerythritol tetraisostearate | 0.40 | " |
| Isostearic acid | 0.08 | " |
| Silicone oil | 0.02 | " |

The above components are mixed at ambient temperature in a Nautamixer, provided with a Rotor-Dispenser to obtain a homogeneous well flowing thick liquid, which, after standing for a few hours, becomes totally free of air. This liquid can be processed, amongst others, to obtain PVC-dips and PVC-pastes. After gelation the material is perfectly transparent and light resistant. By the addition of pigments every desired colour can be obtained, both transparent and non-transparent.

EXAMPLE X

| | | |
|---|---|---|
| P.V.C. resin, k-value 67/71 | 100 | parts by weight |
| Stabilizer M2 | 0.3 | " |
| Trinonyl phenyl phosphite | 0.4 | " |
| Polybutyl imine | 0.1 | " |
| Benzoyl-2,3-dimethyl-alpha-naphthindole | 0.05 | " |
| Epoxy soy bean oil | 3.0 | " |
| Glycerol monoleate | 0.2 | " |
| Glycerol dioleate | 0.2 | " |
| Diisobutyl adipate | 10.0 | " |
| Dioctyl adipate | 10.0 | " |
| Aceto-tri-n-butylcitrate | 40.0 | " |
| Pentaerythritol tetraisostearate | 1.0 | " |
| Oleic acid | 0.3 | " |

The above components are heated at 100°/110° C. until a dry agglomerate is obtained, which is suitable for calandering of flex. P.V.C. film for packaging of i.a. meat-products.

EXAMPLE XI

| | | |
|---|---|---|
| P.V.C. resin, k-value 67/71 | 100 | parts by weight |
| Stabilizer M2 | 0.3 | " |
| Trinonyl phenyl phosphite | 0.4 | " |
| Poly-2-methylbutyl imine | 0.1 | " |
| Benzoyl-2,3-dimethyl-alpha-naphthindole | 0.05 | " |
| Epoxy soy bean oil | 3.0 | " |
| Lithium isostearate | 1.2 | " |
| Glycerol monoisostearate | 0.2 | " |
| Glycerol disostearate | 0.2 | " |
| Isostearic acid | 0.5 | " |
| Diisobutyl adipate | 10.0 | " |
| Dioctyl adipate | 10.0 | " |
| Aceto-tri-n-butylcitrate | 40.0 | " |

The above components are heated at 100°/110° C. until a dry agglomerate is obtained, which is suitable for calandering flex. P.V.C. glass-clear film. This film can be used for packaging foods.

EXAMPLE XII

| | | |
|---|---|---|
| P.V.C. resin, k-value 67/71 | 100 | parts by weight |
| Lithium isostearate | 1.2 | " |
| Stabilizer M3 | 0.3 | " |
| Diphenyl isooctyl phosphite | 0.4 | " |
| Poly-2-methylbutyl imine | 0.1 | " |
| Benzoyl-2-phenyl-3-methyl naphthindole | 0.03 | " |
| Epoxy soy bean oil | 3.0 | " |
| Pentaerythritol monoisostearate | 0.2 | " |
| Diisooctyl adipate | 20.0 | " |
| Dioctyl phthalate | 30.0 | " |
| Poly-(dipropylene)-glycol adipate | 10.0 | " |
| Isostearic acid | 0.5 | " |

The above components are heated at 100°/110° C. until a dry agglomerate is obtained. This agglomerate is suitable for calandering flex. P.V.C., glass-clear and light resistant film and can also be processed on injection molding apparatus to obtain highly transparent and light resistant products.

The stabilizing effect of the stabilizers prepared according to the Examples I–XII and the formulations according to the invention is compared with a Ba/Cd/Zn-stabilizer having metal contents of about 5.3% barium, 3.2% cadmium and 0.5% zinc, which has shown to be suitable for calander processing. To this end 100 g of S. P.V.C. (k-value 70), 50 g of dioctyl phthalate, 0.5 g of paraffin wax and 2.0 g of stabilizer is mixed in a high velocity mixing apparatus and the heat stability is tested by a milling test at 190° C. Samples were taken at 5 minute intervals and the results are shown in the following table.

TABLE

| Stabilizer | Rolled film | 5' | 10' | 15' | 20' | 25' | 30' | 35' | 40' | 45' | 50' |
|---|---|---|---|---|---|---|---|---|---|---|---|
| Ba/Cd/Zn stabilizer | 5,6 | 9,6 | 11,7 | 14 | 15,9 | 15,2 | | 31,1 | Brown | | |
| According to Example I, Rigid P.V.C. | 2,0 | 2,1 | 3,2 | 4,8 | 5,2 | 5,8 | 6,3 | 7,8 | 8,5 | 9,1 | 9,8 |
| According to Example II, Rigid P.V.C. | 2,0 | 2,0 | 2,8 | 3,2 | 4,0 | 4,2 | 4,8 | 5,3 | 6,2 | 7,8 | 8,4 |

TABLE-continued

| | | | | | | | | | | |
|---|---|---|---|---|---|---|---|---|---|---|
| According to Example III, Rigid P.V.C. | 2,0 | 2,0 | 2,1 | 2,6 | 3,3 | 3,8 | 4,0 | 4,6 | 5,1 | 5,8 | 6,2 |
| According to Example IV, Flex. P.V.C. | 2,2 | 2,2 | 2,4 | 2,6 | 3,1 | 3,5 | 3,8 | 4,1 | 4,8 | 5,2 | 5,8 |
| According to Example V, Flex. P.V.C. | 2,2 | 2,2 | 2,3 | 2,3 | 2,6 | 3,0 | 3,2 | 3,8 | 4,0 | 4,9 | 5,8 |
| According to Example VI, Rigid P.V.C. | 2,0 | 2,0 | 2,2 | 2,8 | 3,2 | 3,8 | 4,6 | 5,3 | 6,8 | 7,4 | 8,9 |
| According to Example VII, Rigid P.V.C. black | Black | Bl. | Bl. | Bl. | Bl. | Bl. | Bl. | Bl. | Bl. | Bl. | Bl. |
| According to Example VIII, Flex. P.V.C. white | White | Wh. | Wh. | Wh. | Wh. | Wh. | Wh. | Wh. | Wh. | Wh. | Yellow |
| According to Example IX, Flex. P.V.C. | 2,2 | 2,2 | 2,2 | 2,2 | 2,3 | 2,6 | 3,0 | 3,8 | 4,6 | 5,8 | 7,2 |
| According to Example X, Flex. P.V.C. | 2,2 | 2,3 | 2,6 | 3,0 | 3,6 | 4,2 | 5,8 | 6,3 | 6,8 | 7,6 | 8,2 |
| According to Example XI, Flex. P.V.C. | 2,2 | 2,2 | 2,4 | 2,6 | 2,8 | 3,2 | 3,8 | 4,6 | 5,3 | 6,1 | 6,9 |
| According to Example XII, Flex. P.V.C. | 2,2 | 2,2 | 2,2 | 2,3 | 2,6 | 2,8 | 3,2 | 3,8 | 4,6 | 5,2 | 5,8 |

The table shows the superiority of the stabilizer and the formulation of the present invention, which is still emphasized by the remarkable stabilizing effect with respect to rigid and flexible P.V.C.

Various modes of carrying out the invention are contemplated as being within the scope of the following claims particularly pointing out and distinctly claiming the subject matter which is regarded as the invention.

I claim:

1. Liquid stabilizing composition for use in chlorine containing thermoplastic polymers, comprising
   a. 0.1–3 wt % of one or more metal halides, such as zinc chloride and/or aluminum chloride or mixtures of the zinc chloride and/or aluminum chloride with magnesium chloride, calcium chloride, lithium chloride and barium chloride;
   b. 0.5–20 wt % of an ethoxylated $C_5$–$C_{22}$ alkyl mercaptan with 2–8 ethoxy groups;
   c. 1–30 wt % of aliphatic unsaturated linear or branched monocarboxylic acids and/or aliphatic saturated and branched monocarboxylic acids;
   d. 4–30 wt % of a liquid organic phosphite;
   e. 0.5–25 wt % of an organic polyimine; and
   f. 0.2–10 wt % of an alkyl substituted naphthindole on positions 2 and 3.

2. Composition according to claim 1, characterized in that the said aliphatic monocarboxylic acid contains from 6 to 18 carbon atoms.

3. Composition according to claim 1, characterized in that the said unsaturated aliphatic monocarboxylic acid contains from 16 to 18 carbon atoms.

4. Composition according to claim 1, characterized in that the said aliphatic monocarboxylic acid is branched on the alpha-position.

5. Composition according to claim 1, characterized in that the said aliphatic monocarboxylic acid is saturated and contains from 8 to 13 carbon atoms.

6. Composition according to claim 1, characterized in that it comprises polybutyl imine as component e.

7. Composition according to claim 1, characterized in that it comprises poly-2-methylbutyl imine as component e.

8. Composition according to claim 1, characterized in that it comprises 2,3-dimethyl-alpha- or -beta-naphthindole as component f.

9. Composition according to claim 1, characterized in that it comprises 2-phenyl-3-methyl-alpha- or -beta-naphthindole as component f.

10. Composition according to claim 1, characterized in that it comprises benzoyl-2,3-dimethyl-alpha- or -beta-naphthindole as component f.

11. Composition according to claim 1, characterized in that it comprises benzoyl-2-phenyl-3-methyl-alpha-or -beta-naphthindole as component f.

12. Composition according to claim 1, characterized in that it comprises an ethoxylated tert.dodecyl mercaptan as component b.

13. Composition according to claim 1, characterized in that it comprises an alkyl aryl phosphite as component d.

14. Composition according to claim 13, characterized in that it comprises a dialkyl phenyl phosphite.

15. Composition according to claim 13, characterized in that the alkyl group contains from 8 to 14 carbon atoms.

16. Composition according to claim 15, characterized in that it comprises ditetradecyl phenyl phosphite, didecyl phenyl phosphite, dimyristyl phenyl phosphite, myristyl diphenyl phosphite or (dinonylphenyl) isotridecyl phosphite.

17. Composition according to any one of the preceding claims, comprising furthermore an antioxidant selected from the group consisting of sterically hindered alkyl phenols, such as 2,6-di-tert.butyl-4-methylphenol and 4-hydroxymethyl-2,6-di-tert.butylphenol.

18. Stabilized compositions comprising a thermoplastic polyvinyl halide substrate selected from one member of the group consisting of polyvinyl chloride and polyvinylidene chloride and 0.5–8% by weight, based upon the total composition, of the stabilizing composition of any one of the preceding claims.

19. Composition according to claim 18 characterized in that it comprises a polymer of, or based upon, vinyl chloride.

20. Composition according to claim 19, comprising furthermore a plasticizer.

21. Composition according to claim 19, characterized in that the polymer is an S- or an M-polyvinyl chloride.

* * * * *